(12) United States Patent
Isfort et al.

(10) Patent No.: US 8,042,644 B2
(45) Date of Patent: Oct. 25, 2011

(54) SELF-PROPELLED FORAGE HARVESTER

(75) Inventors: Heinrich Isfort, Duelmen (DE);
Manfred Gersmann, Warendorf (DE);
Werner Engenhorst, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 579 days.

(21) Appl. No.: 12/181,517

(22) Filed: Jul. 29, 2008

(65) Prior Publication Data
US 2009/0031686 A1    Feb. 5, 2009

(30) Foreign Application Priority Data

Jul. 31, 2007    (DE) .......................... 10 2007 036 292

(51) Int. Cl.
*B60K 17/16* (2006.01)
(52) U.S. Cl. ...................................................... 180/378

(58) Field of Classification Search .................. 180/378, 180/905, 311, 312; 301/124.1
See application file for complete search history.

(56) References Cited

FOREIGN PATENT DOCUMENTS

| DE | 75 665 | | 8/1970 |
|---|---|---|---|
| DE | 10227027 A1 | * | 12/2003 |
| EP | 1 151 655 | | 11/2001 |
| EP | 1321026 A1 | * | 6/2003 |

* cited by examiner

*Primary Examiner* — Faye M. Fleming
(74) *Attorney, Agent, or Firm* — Michael J. Striker

(57) ABSTRACT

The present invention relates to a self-propelled forage harvester (1) that is equipped with a front attachment (3) and includes a rigid axle (5), a transmission (10) and two wheel gears (9), which are installed upstream of the drive wheels (7) and are coupled with the transmission (10) in a driving manner, the drive axle (5) being composed of a center part (31) and axle carrier units (28) rigidly flange-connected on the right and left sides of the center part (31), each axle carrier unit (28) including wheel gears (9) that extend forward, in the direction toward the front attachment (3).

17 Claims, 2 Drawing Sheets

SELF-PROPELLED FORAGE HARVESTER

CROSS-REFERENCE TO A RELATED APPLICATION

The invention described and claimed hereinbelow is also described in German Patent Application DE 10 2007 036 292.9 filed on Jul. 31, 2007. This German Patent Application, subject matter of which is incorporated herein by reference, provides the basis for a claim of priority of invention under 35 U.S.C. 119(a)-(d).

BACKGROUND OF THE INVENTION

The present invention relates to a self-propelled forage harvester. Every self-propelled forage harvester is built on a ground drive, which is composed of a machine frame. The machine frame serves as a carrier for individual components. The location of the components on the machine frame plays an essential role in terms of the efficiency of the forage harvester. The components located underneath the frame are the front axle and the rear axle, each of which includes wheels. The drive wheels, wheel gears, and a transmission are installed on the front axle. The steering wheels are installed on the rear axle. Together with the front wheels, the rear axle supports the frame on the ground. The upper components are installed above the frame, i.e., the driver's cab, machine housing, and devices for processing and conveying the crop material, and the drive unit, which is supported on the machine frame. One or more containers for storing a combustible fluid are located between the frame. The location of the components relative to each other determines the weight distribution and, therefore, the center of gravity of the forage harvester. The center of gravity is also determined by the front attachment, which is located in front of the front axle, and it influences the permissible axle load.

Self-propelled agricultural harvesting machines, in particular forage harvesters and combine harvesters with a large overall mass, a heavy front attachment, and a rigid axle are adequately known from the related art. The center of gravity is determined by the design. When different front attachments are used, e.g., a combine harvester header, a corn header, or a pick-up, the center of gravity may shift, which is unfavorable.

To solve this problem, publication DD 75 665 discloses a ground drive for a forage harvester that is composed of three independent subassemblies. The assemblies are a frame, a drive axle, and a steering axle, which are interconnected via detachable connecting elements. By displacing the connecting elements, it is possible to displace the three subassemblies, thereby making it possible to shift the center of gravity of the machine.

In contrast, publication EP 1 151 655 A1 provides that all components of the harvesting machine are located relative to each other such that the center of gravity of the ready-to-operate harvesting machine with the front attachment installed is located at an exactly defined distance behind the front axle and at an exactly defined height above the ground.

The designs described in publications DD 75 665 and EP 1 151 655 A1 have the disadvantage, however, that a complex design is required in order to realize an optimal center of gravity of the machine. When front attachments are replaced often, it is therefore necessary to install additional ballast weights or to displace the connecting elements in order to optimize the center of gravity of the harvesting machine and, therefore, to control the vehicle. Harvesting machines of this type are capable of reaching driving speeds of up to 40 km/h on the road. Due to the high overall mass of the harvesting machine itself and the front attachment that is installed, it is not possible to drive the harvesting machine on the road with good control without additional ballast weights.

SUMMARY OF THE INVENTION

The object of the present invention, therefore, is to provide a self-propelled forage harvester of the type described initially that prevents the aforementioned disadvantages of the known designs of the related art, and to provide a technical solution that makes it possible to optimize the weight distribution of the self-propelled forage harvester without installing additional ballast weights.

This problem is solved by the characterizing features of claim 1. Advantageous embodiments and refinements of the present invention result from the subclaims and the descriptions, below.

Given that the drive axle of the forage harvester is composed of a center part and axle carrier units that are rigidly flange-connected on the right and left sides of the center part, with each axle carrier unit including integrated wheel gears that are forwardly-positioned in the direction toward the front attachment, the distance between the rear axle and front axle of the drive wheels is advantageously increased, and the drive wheels are located closer to the front attachment, thereby resulting in an optimum weight distribution for the ready-to-operate harvesting machine.

The inventive drive axle of the harvesting machine is one assembly, and it is composed of three subassemblies. One assembly is a center part, which is composed of a transmission and is therefore part of the drive axle. The assembly is also composed of assemblies that are rigidly flange-connected to the right and left of the center part and each form an axle carrier unit. Each axle carrier unit includes a wheel gear that is forwardly-positioned in the direction toward the front attachment. The axle carrier units that are flange-connected to the right and left of the transmission are designed with mirror symmetry, with the exception of a few details.

The transmission parts are located in an axle carrier unit, which is composed of a molded body. The molded body is manufactured as a single-pieced, die-cast body produced using a forming process. The die-cast body therefore serves as a housing for the axle carrier unit, the housing of the axle carrier unit having an outer contour that is approximately L-shaped in design. Due to the L-shaped contour of the housing of the axle carrier unit, the molded body contains—according to the present invention—two cavities, which are interconnected, and one of which is located perpendicularly relative to the other cavity.

The individual transmission parts are accommodated in the cavity that forms the short leg of the L-shaped housing, and they are mounted therein. This part of the housing of the axle carrier unit forms the wheel gear that is forwardly positioned in the direction toward the front attachment. The other cavity of the housing of the axle carrier unit is located in the long leg of the L-shaped housing, which approximately forms a cylindrical hollow body. This second cavity—rather than the first, forwardly-positioned cavity—accommodates the drive shaft of the wheel gear and/or the output shaft of the transmission and, together with the transmission that is flange-mounted thereon, forms a reference line. The housing with the second cavity forms part of an axle body of the drive axle.

When both axle bodies are screwed together with the transmission between them in an assembly process, an assembly is produced that is the inventive drive axle and is composed of three independent subassemblies. The three subassemblies are composed of two axle carrier units and the transmission with brakes. One subassembly includes, e.g., the left axle carrier unit, a further subassembly includes the right axle carrier unit, and the third subassembly includes the transmission with the brakes. Due to this rational configuration, production and assembly are simplified, thereby also reducing costs. The compact design of the assembly also results in improved heat dissipation and greater dust protection. The inventive drive axle for the forage harvester, which is formed by the complete assembly, now has a U-shaped or forked design, due to the two axle carrier units with forwardly-positioned wheel gears that are flange-mounted on the right and left ends of the transmission in L-shaped positions. This U-shaped or forked design results from the fact that the short, L-shaped leg of the gear wheel points in the direction of travel and/or the direction of the front attachment. As a result, the drive wheels are shifted forward until they are close to the front attachments. This displacement of the drive wheels results in a more favorable weight distribution.

In an advantageous refinement of the present invention, the U-shaped or forked drive axle includes a working unit of the forage harvester that is designed as a chopping assembly, thereby making it possible to shift the front wheels further forward.

With regard for the advantageous distribution of forces and weights of components on the forage harvester, mainly when heavy front attachments are used, the wheel gears—which are shifted forward by a certain amount relative to the rigid drive axle of the axle body—are also rotated upwardly around a certain angle relative to the horizontal, which extends parallel to the machine frame as viewed in the longitudinal direction. The angle relative to the horizontal of the upwardly pointing wheel gears of the rigid drive axle may be approximately—depending on the design of the drive axle—between 10 degrees and 50 degrees, and it is preferably 30 degrees. The angle about which the wheel gear is rotated upwardly corresponds to an angle of rotation that extends through the center of the drive axle and the horizontal. The angle of rotation therefore determines the height—relative to the horizontal—of the output shaft of the wheel gear, which is located with axial offset relative to the drive shaft.

Given that the wheel rim of the drive wheel includes the forwardly-positioned wheel gears, the direct inner distance between the wheel gears increases, thereby resulting in more space for the working unit and enabling the working unit to be moved closer to the rigid drive axle.

A further inventive advantage results from the positioning of the axial offset between the actual rigid axle, which is formed by output shafts of the transmission, which contain the axle bodies, and the output shaft in the forwardly-positioned wheel gears. Given that the drive wheel is offset toward the front relative to the actual rigid axle, it is possible to realize a simple rotary joint on the particular output shaft of the wheel gear and/or wheel shaft. For this purpose, two side walls of the wheel gear include openings, which are located opposite to each other, in parallel, with distance between them, and which receive the output shaft with related bearing and sealing means. In addition, the possibility of installing a tire pressure control system is created, which would allow the drive tires to be easily filled.

To install the inventive drive axle on the machine frame of the harvesting machine, an axle carrier unit is equipped with an integrated support element on the axle carrier housing in the region of the cylindrical part. To optimally receive the machine frame and the working unit, the side of the cylindrical part of the axle body housing facing the frame is provided with flat sections.

DESCRIPTION OF THE PREFERRED EMBODIMENTS

Figure 1:
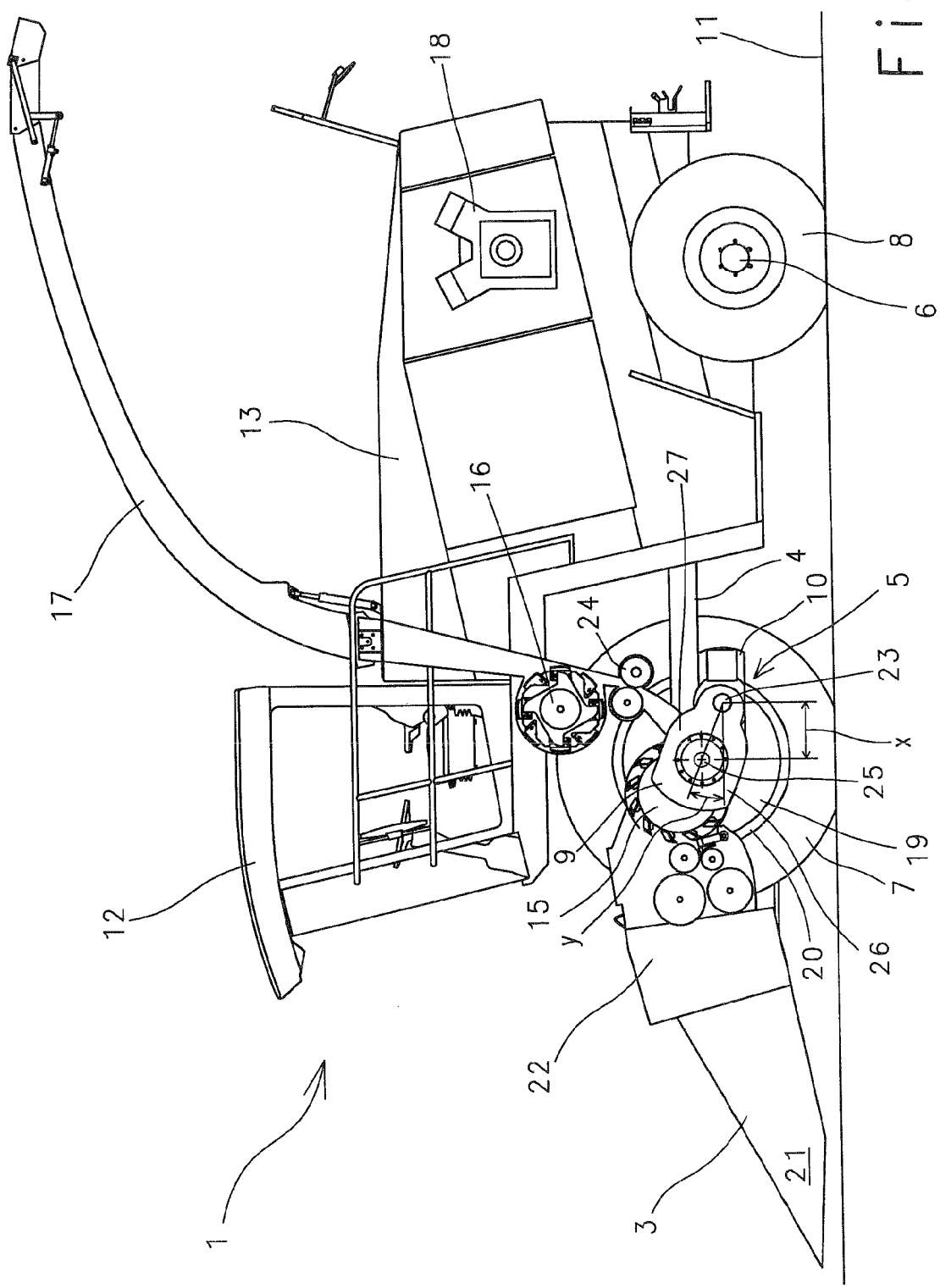
FIG. 1 shows a schematic view of a forage harvester with the inventive drive axle.

FIG. 1 is a schematic depiction of a self-propelled forage harvester 1, which serves to pick up and process crop material. Forage harvester 12 includes a ground drive, which is formed by a machine frame 4. Machine frame 4 is a carrier for individual components. The location of the components on machine frame 4 plays an essential role in terms of the efficiency of forage harvester 1. The components located underneath frame 4 are front axle 5 and rear axle 6, each of which includes wheels 7, 8. Drive wheels 7, axle carrier units 28 with wheel gears 9, and a transmission 10 are installed on front axle 5. Rear axle 6, which is preferably designed to be height-adjustable, is designed as a swing axle 6, and is resiliently supported relative to machine frame 4, carries steering wheels 8 and, along with drive wheels 7, supports machine frame 4 on ground 11. The upper components are located above machine frame 4, i.e., driver's cab 12 and a machine housing 13. Processing devices, e.g., material processing device 15 in the form of a chopping assembly 41, and devices for conveying the crop material, e.g., a blower 16 with lower discharge chute 17, and drive unit 18, are also supported on machine frame 4.

One or more containers for storing a combustible fluid are located between the frame. The location of the components relative to each other determines the weight distribution and, therefore, the center of gravity of forage harvester 1. The position of the center of gravity is also determined by front attachment 3, which is located in front of front axle 5, and it influences the permissible axle load. Forage harvester 1 shown therefore includes a large number of components that determine the overall center of gravity of harvesting machine 1, e.g., the air filter device, the cooling assembly, and the exhaust system. These components are not shown in FIG. 1. All components of forage harvester 1 are positioned relative to each other such that the center of gravity of ready-to-operate forage harvester 1, including front attachment 3, is located behind front axle 5 and/or drive axle 5 by a certain distance, as viewed in direction of travel F.

The distance of the center of gravity from front axle 5 varies depending on changeable quantities, however, which affect the weight. Changeable quantities result, e.g., when the tank content changes, or when the crop material or its moisture content change, and, primarily, due to the different quantities and weights of front attachments 3. It must therefore be ensured that a certain distance from the center of gravity to front axle 5 is not exceeded. To ensure that the varying center of gravity of forage harvester 1 does not reach a critical range, which poses a disadvantage mainly at higher ground speeds, an inventive drive axle 5 with forwardly-positioned wheel gears 9 is used. Wheel gears 9 are integrated in cavity 19 of wheel rims 20 of drive wheels 7. Wheel rims 20 enclose forwardly-positioned wheel gears 9, thereby resulting in optimal free space between wheel gears 9 for material processing device 15.

Material processing device 15 is positioned between forwardly-positioned wheel gears 9. Drive wheels 7 are therefore moved closer to front attachment 3, by the amount determined by distance "X". Distance "X" results from the fixedly specified distance between the transmission shafts of wheel gear 9 and drive shaft 23 relative to output shaft 25. Drive shaft 23 approximately represents the center axis of drive axle 5. Drive shaft 23 and output shaft 25 are enclosed in a dust-proof manner by housing 27 of molded body 26 of axle carrier unit 28 (see FIG. 2). Drive shaft 23 for wheel gear 9 is supported in the center inside rigid axle carrier unit 28. Drive shaft 23 drives—via wheel gears 9, and in a manner that will not be described in greater detail—drive wheels 7, which are screwed onto drive flanges 29 (see FIG. 2).

Figure 2:
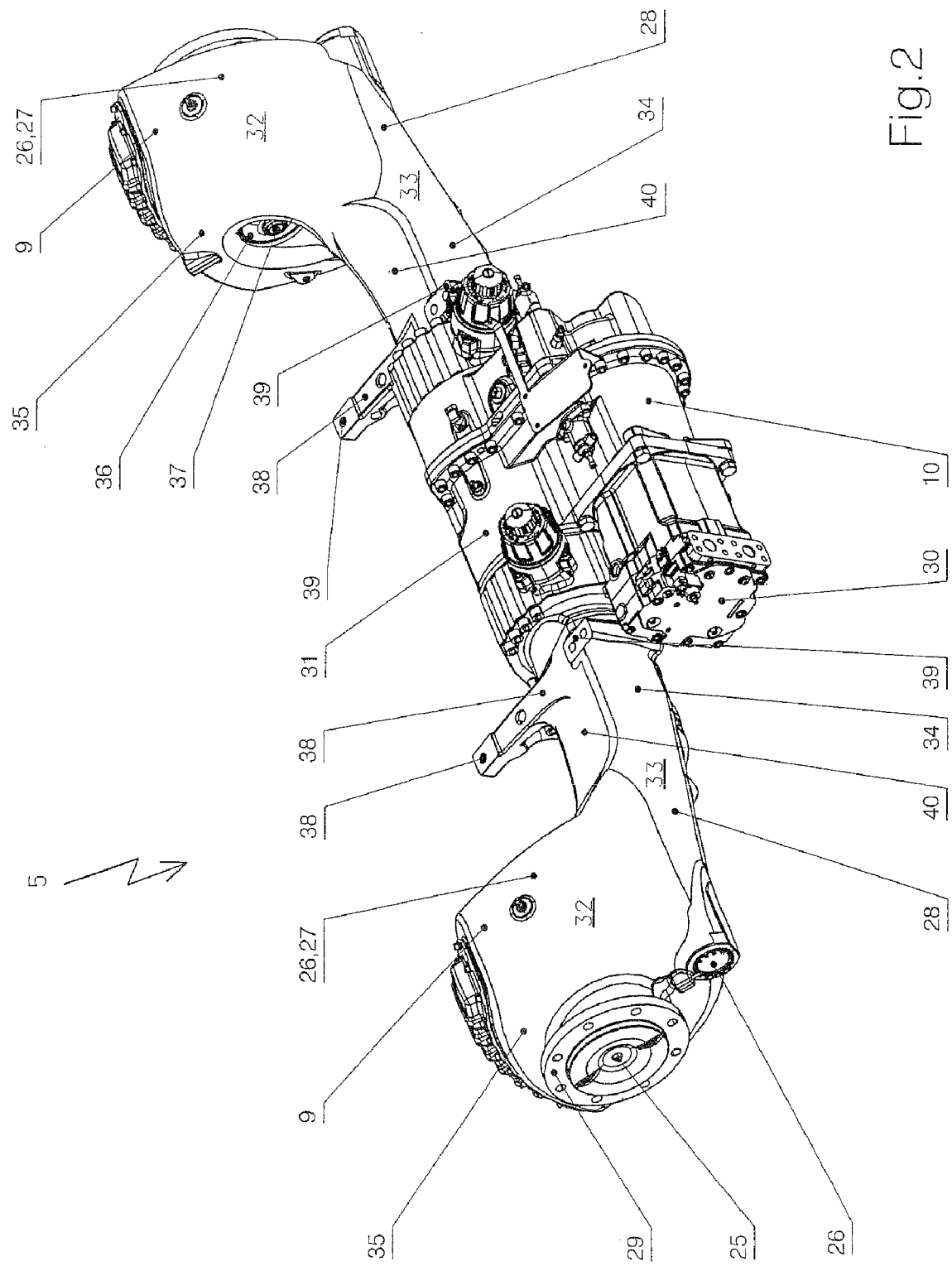
FIG. 2 is a perspective view of the inventive drive axle.

Wheel gears 9, which are shifted forward by a certain amount "X", also point upwardly by a certain amount relative to the horizontal. The "certain amount" corresponds to an angle "Y", which is defined by molded body 26, which is designed according to the present invention. Angle "Y" is approximately 30 degrees. One leg of angle "Y" is formed by the horizontal, and the other leg of angle "Y" intersects the two center axes of drive shaft 23 and output shaft 25. The point of intersection of the two legs of angle "Y" is in the center of drive shaft 23. FIG. 2 shows, in greater detail, the complete rigid drive axle 5, which is composed of a center part 31 that is transmission 10, and axle carrier units 28, which are flange-mounted on the right and left sides and serve to drive the drive wheels 7.

Inventive rigid drive axle 5 is shown in FIG. 2 in a perspective view. Drive axle 5 is composed of an assembly 30, which is composed of three subassemblies. One assembly 30 is composed of a center part 31, which is a transmission 10. Transmissions 10 are known from the related art, and will therefore not be described in greater detail. The novel aspect is that transmission 10 is a component of rigid drive axle 5. Two further assemblies, which are composed of axle carrier units 28, are flange-mounted on the right and left sides. Axle carrier units 28 include wheel gears 9, which are shifted forward in the direction toward front attachment 3. Complete drive axle 5 has a U-shaped or forked design. Right and left axle carrier units 28 are designed with mirror symmetry, with the exception of a few details. Each axle carrier unit 28 is a molded body 26 that forms a housing 27 with an L-shaped contour. Housing 27 of an axle carrier unit 28 contains two cavities 32, 33. Cavities 32, 33 are positioned perpendicularly to each other. Cavity 32 accommodates the transmission parts (not shown), and cavity 33 contains drive shaft 23—which extends from transmission 10—for wheel gear 9. Cavity 32 in axle carrier unit 28 forms, in axle body 34, forwardly-positioned wheel gear 9, while cavity 33 of axle carrier unit 28 forms the region of axle body 34 for connection to transmission 10.

Side walls 35 of wheel gears 9 include openings 36 for receiving a rotary joint 37, which accommodates output shaft 25 in the center, on the end of which a drive flange 29 for receiving wheel rim 20 of drive wheel 7 is mounted. Output shaft 25 extends parallel to drive shaft 23, and inner and outer openings 37 are closed in a dust-proof manner after the transmission parts are installed. To install drive axle 5 on machine frame 4, molded body 26 is equipped with support elements 38 on housing 27. Support elements 38 are located on either side of axle body 34 around the region of cavity 33 and form part of axle carrier unit 28. Planar receiving surfaces 38 extend parallel to the lower planar surfaces (not shown) of machine frame 4 and are therefore located such that they are offset horizontally and in parallel with the leg of angle "Y".

Receiving surfaces 38 are longitudinal in the direction toward front attachment 3, taper toward the end, and serve to receive the not-shown chopping assembly. An additional receiving element is therefore not required on the machine frame. On the side facing machine frame 4, the surface of axle body 34 of axle carrier unit 28 includes flat sections 40, which, in the overall design of drive axle 5, make a contribution toward utilizing the spacial requirements for machine frame 4 and material processing device 15.

It is within the scope of the ability of one skilled in the technical art to modify the exemplary embodiment described in a manner not presented, in order to achieve the effects described, without leaving the framework of the present invention.

The invention claimed is:

1. A self-propelled forage harvester (1) that is equipped with a front attachment (3) and includes a drive axle (5), a transmission (10) and two wheel gears (9), which are installed upstream of the drive wheels (7) and are coupled with the transmission (10) in a driving manner, wherein the drive axle (5) is composed of a center part (31) and axle carrier units (28) rigidly flange-connected on the right and left sides of the center part (31), each axle carrier unit (28) including wheel gears (9) that extend forward, in a direction toward the front attachment (3).

2. The self-propelled forage harvester (1) as recited in claim 1, wherein the center part (31) is a transmission (10).

3. The self-propelled forage harvester as recited in claim 1, wherein each axle carrier unit (28) is composed of a molded body (26).

4. The self-propelled forage harvester (1) as recited in claim 1, wherein each molded body serves as a housing (27) for the axle carrier unit (28).

5. The self-propelled forage harvester (1) as recited in claim 4 wherein the housing (27) of the axle carrier unit (28) has an L-shaped contour and contains two cavities (32, 33), which are interconnected and are located perpendicularly to each other.

6. The self-propelled forage harvester (1) as recited in claim 5, wherein one cavity (32) accommodates individual parts comprising transmission (10) and forms the forwardly-positioned wheel gear (9).

7. The self-propelled forage harvester (1) as recited in claim 5, wherein one cavity (33) accommodates a drive shaft (23) of the wheel gear (9) and forms part of an axle body (34).

8. The self-propelled forage harvester (1) as recited in claim 1, wherein the drive axle (5) is an assembly (30) composed of three subassemblies.

9. The self-propelled forage harvester (1) as recited in claim 8, wherein the subassemblies are composed of two axle carrier units (28) and a transmission (10) with brakes.

10. The self-propelled forage harvester (1) as recited in claim 1, wherein the complete drive axle (5) has a U-shaped or forked design.

11. The self-propelled forage harvester (1) as recited in claim 1, wherein the drive axle (5) with the U-shaped or forked design includes a material processing device (15).

12. The self-propelled forage harvester (1) as recited in claim 11, wherein the material processing device (15) is a chopping assembly (41).

13. The self-propelled forage harvester (1) as recited in claim 1, wherein the output shaft of the wheel gear (9) is offset relative to a drive shaft (23) by a certain distance (X).

14. The self-propelled forage harvester (1) as recited in claim 1, wherein a forwardly-positioned wheel gear (9) points upwardly about the center of the drive axle (5) by a certain angle (Y) relative to the horizontal.

15. The self-propelled forage harvester (1) as recited in claim 1, wherein the forwardly-positioned wheel gear (9) is enclosed in a wheel rim (20) of one of the drive wheels (7).

16. The self-propelled forage harvester (1) as recited in claim 1, wherein the wheel gear (9) includes openings (36) in side walls (35) for a rotary joint (37).

17. The self-propelled forage harvester (1) as recited in claim 1, wherein the axle carrier unit (28) includes flat sections (38) for receiving a material processing device (15).

* * * * *